United States Patent [19]
Garside

[11] Patent Number: 5,336,124
[45] Date of Patent: Aug. 9, 1994

[54] HORIZONTAL SKINNING AND PROTECTION APPARATUS

[76] Inventor: Ted L. Garside, 3083 Northwoods Way, Redding, Calif. 96002

[21] Appl. No.: 950,163

[22] Filed: Sep. 24, 1992

[51] Int. Cl.$^5$ ............................................. A22B 5/16
[52] U.S. Cl. ...................................... 452/125; 452/187
[58] Field of Search ............... 425/125, 128, 185, 187, 425/193, 194

[56] References Cited

U.S. PATENT DOCUMENTS

| | | | |
|---|---|---|---|
| 1,290,056 | 1/1919 | Bintliff | 150/52 |
| 2,494,138 | 1/1950 | De Moss | 17/21 |
| 2,497,325 | 2/1950 | Scherba | 150/52 |
| 2,518,651 | 8/1950 | Weiss et al. | 62/31 |
| 3,209,395 | 10/1965 | Jones et al. | 17/21 |
| 3,674,188 | 7/1992 | Anderson | 224/5 G |
| 3,763,907 | 10/1973 | Hockley et al. | 150/1 |
| 3,871,084 | 3/1975 | Carrington et al. | 17/21 |
| 4,011,630 | 3/1977 | Ochylski | 17/21 |
| 4,296,788 | 10/1981 | Slater | 150/52 R |
| 4,301,920 | 11/1981 | Boggs | 206/315 R |
| 4,317,257 | 3/1982 | Engel | 17/21 |
| 4,529,240 | 6/1985 | Engel | 294/141 |

Primary Examiner—Willis Little
Attorney, Agent, or Firm—Bernhard Kreten

[57] ABSTRACT

A method and apparatus for skinning while protecting the hide and carcass of game animals while the game animal may be held in a horizontal position at ground level. The apparatus includes a head harness for connection of the head of the game animal to a stationary object. Also included is a skin remover which is attachable to the skin of the animal just below a neck incision and is also attachable to a vehicle bumper. A wrap-around game bag locatable beneath the game during the skinning process ensures that dirt and debris are kept away from the game during the skinning process. The method of skinning includes attaching the head of the game to a stationary object, attaching the skin remover to a vehicle and then applying force with the vehicle to the skin of the animal while the animal remains attached to the stationary object. Just before the skinning occurs and when tension is maximized, the bag is located in its open orientation beneath the game animal. Once the skin is removed the head harness is removed from the head of the animal and the wrap-around game bag is closed around the thus skinned game animal.

22 Claims, 4 Drawing Sheets

HORIZONTAL SKINNING AND PROTECTION APPARATUS

FIELD OF THE INVENTION

The following invention relates to devices used to remove the skin from an animal. More specifically, this invention relates to methods and apparatus for removing the skin from an animal in the outdoor environment where resources are limited and contamination of the skinned animal is a concern.

BACKGROUND OF THE INVENTION

When a large animal, such as a deer, is shot and killed by a hunter in the wild, the hunter is then left with the job of skinning and carrying home the animal. It is desirable to skin the animal in a way which does no damage to the head and antlers of the animal in that a hunter often desires to mount this portion of the animal. Also, it is desirable for the hunter to place the body of the animal in a bag after the skin of the animal has been removed so that dirt and other contaminants associated with the animal's fur are effectively separated away from the portion of the animal which is useful as meat.

It is well known in the art that through the judicious placing of incisions through the skin of the large game animal, the skin of the animal can be relatively easily removed by merely peeling the skin of the animal off of the carcass. Various patents have been awarded for devices which more easily facilitate this skinning process.

However, all of these devices are designed for use in a substantially similar way. That is, first the animal is suspended from a tree limb so that the animal is elevated above the ground. Then a cable is attached to the skin of the animal behind the neck. Upon applying tension to the cable, as with a vehicle, the skin is peeled away from the animal. At the outset of the peeling process the animal is hanging substantially vertically and the point of cable connection is high on the animal with an opposite end of the cable a considerable distance away attached to a vehicle. Thus, the peeling force is substantially perpendicular to a dorsal surface of the animal. As the peeling occurs, the point of cable connection moves down the animal causing the animal to pivot toward the vehicle. When the peeling is nearly complete, the peeling force is substantially parallel to the animal.

The animal is suspended from a tree so that once the skin is removed, the animal will not be contaminated by dirt or other debris lying on the ground. While this provides a clean and relatively simple method for skinning a large game animal, it is not always possible to string the large game animal up into a tree. In some outdoor environments, no trees are readily available having the characteristics desired for elevating the large game animal above the ground. In other circumstances, the animal which has been killed is so large that the hunter is unable to suspend the animal in a tree. In these circumstances the prior art devices are not capable of effectively performing the skinning function desired.

Furthermore, the prior art method utilizes a peeling force angle which migrates slowly from being perpendicular to the dorsal surface to being parallel to the dorsal surface. While perpendicular forces are useful to initiate the peeling process, horizontal peeling forces are preferable in that they diminish the possibility that the skin will tear.

The applicant's invention addresses these problems by providing a skinning and protection device which is useable in a horizontal position at ground level. The applicant's method results both in substantial time savings and also makes the skinning process possible in environments and with game which the other prior art devices and methods are incapable of so doing. In additional to time savings, the applicant's horizontal skinning method eliminates the possibility that the animal may fall from its suspended position in a tree and possibly damage its head and antlers. Also, the applicant's method and apparatus provide a peeling force which is initially perpendicular to the dorsal surface but quickly pivots to provide a parallel peeling force.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | U.S. PAT. NO. | ISSUE DATE |
| --- | --- | --- |
| Bintliff | 1,290,056 | January 7, 1919 |
| DeMoss | 2,494,138 | January 10, 1950 |
| Scherba | 2,497,325 | February 14, 1950 |
| Weiss, et al. | 2,518,651 | August 15, 1950 |
| Jones, et al. | 3,209,395 | October 5, 1965 |
| Anderson | 3,674,188 | July 4, 1972 |
| Hockley, et al. | 3,763,907 | October 9, 1973 |
| Carrington, et al. | 3,871,084 | March 18, 1975 |
| Ochylski | 4,011,630 | March 15, 1977 |
| Slater | 4,296,788 | October 27, 1981 |
| Boggs | 4,301,920 | November 24, 1981 |
| Engel | 4,317,257 | March 2, 1982 |
| Engel | 4,529,240 | July 16, 1985 |

The patent to Carrington is of interest in that it teaches a deer skinning apparatus and method which uses a cable attached to the skin of the animal which pulls the skin of the animal off of the animal as does the device described by this application. However, the applicant's invention is distinguishable from Carrington's device in that Carrington requires suspension of the animal from a support such as a tree limb high enough above the ground to elevate the animal above the ground.

The patent to Engel ('257) teaches the use of an animal carrying and skinning device which utilizes a similar skinning method to that disclosed by Carrington. The applicant's method and device are distinguishable from Engel in that the animal is not suspended from the limb of a tree, but rather may be connected to any stationary object. Also, means are provided in the applicant's invention to ensure that damage to the animal, antlers and tearing of the skin is avoided.

The remainder of this prior art cited but not specifically distinguished from the applicant's invention share only limited similarities to the requirements of the applicant's invention and diverge even more starkly from the applicant's invention than do those patents specifically distinguished. Accordingly, applicant's invention exhibits a skinning method and device which is new, useful and not made obvious by the known prior art.

SUMMARY OF THE INVENTION

The horizontal skinning and protection apparatus is composed primarily of three parts: a head harness and antler protection apparatus, a skin remover, and a wrap-around game bag. The head harness and antler protection device primarily serves the function of holding the head of the animal securely while its skin is being peeled away. The skin remover has two ends. The skin remover attaches on one end to the skin of the animal and on another end to a vehicle or other object capable of moving and provides the force by which the skin is removed. The wrap-around game bag is specifically designed to be placed underneath the animal while being skinned in a manner which isolates the animal from both the ground and the associated dirt and debris.

More specifically, the head harness and antler protection device is composed of a line having a loop formed on one end thereof which is adjustable in size. This adjustable loop has a rubber coating which keeps the line, which is preferably of metal cable-like construction, from damaging the animal. A hook is located on an end of the line opposite the adjustable loop having the rubber coating. In use, the loop of the head harness is placed around the antlers of the animal and tightened. Then, the line is wrapped a few times around a stationary object, such as a large rock, tree trunk or a vehicle. The hook is then looped back over the line or into the adjustable loop securing the head of the animal to the stationary object.

The skin remover is formed from a cable which has a first end which is affixed to an interior wall of a hollow cylinder. The cable then extends to a second end which has a loop formed by wrapping the second end back upon itself and attaching it to itself with a clamp. The cylinder has a first end and a second end. The second end loop is located beyond the second end of the cylinder. The first end of the cylinder is covered by a first cap having two holes therein and a spike protruding out from the cylinder. The cable passes through a top hole of the first cap and then forms a first end loop before it passes through a bottom hole of the first cap and out the second end of the cylinder toward the second end loop. Thus, the cable between the top hole and the bottom hole of the first cap forms a loop and the cable may be moved through the cylinder decreasing and increasing the diameter of the loop which extends out of the first cap of the first end of the cylinder. The cylinder is curved slightly in profile. The first end loop is covered with a rubber coating.

In use, the loop is made large enough to receive a small quantity of skin which is peeled away from a portion of the animal just below the nape of the animal's neck. The loop is then tightened around this small skin portion by pulling on the second end loop of the skin remover. This causes the spike to penetrate the small skin portion. Once the small skin portion of the hide of the animal is tightly held by the loop and spike of the skin remover, the second end loop is attached to a bumper of a vehicle or other moving object. The vehicle is then moved in a direction away from the stationary object which holds the head harness. When a sufficient force is supplied by the vehicle, the skin is peeled away from the animal.

The wrap-around game bag is a substantially flat, flexible, rectangular construct. The bag has drawstrings located through sleeves along opposite edges of the bag. On one edge not having a drawstring, a plurality of Velcro ® type fastener hooks are provided. On an opposite side of the bag and on an opposite edge of the bag from the fastener hooks are located a series of complemental Velcro ® type loops.

In use, just before the skin of the animal begins to be removed by motion of the vehicle, the bag is slid under the animal. At this time, tension between the vehicle and the stationary object is at a maximum and the animal has a significant portion of its weight lifted off of the ground so that it is an easy task to slide the wrap-around game bag under the animal. Once the wrap-around game bag is in place beneath the animal, the vehicle then peels away the skin of the animal. Finally, the bag is wrapped over the animal by attaching the fastener hooks to the fastener loops and pulling tight the drawstrings. This encloses the animal within the wrap-around game bag.

The rubber coating on the head harness protects the head and antlers of the animal from damage due to rubbing against the line directly. The rubber coating of the skin remover prevents the cable from tearing through the hide of the animal and forcing the user to reattach the skin remover to the skin of the animal. This method of animal skin removal is especially desirable in that it solves the problem of contamination of the animal during and after skinning without requiring vertical suspension of the animal above the ground.

OBJECTS OF THE INVENTION

Accordingly, it is a primary object of the present invention to provide a method for removal of the skin of an animal without requiring that the animal be suspended vertically above ground and without contaminating the animal with dirt and debris through contact with the ground.

It is another primary object of the present invention to provide a wrap-around game bag which is capable of isolating the animal from the ground and associated debris during and after the horizontal skinning process.

It is another primary object of the present invention to provide a skin remover which includes a rubberized coating which prevents the skin of the animal from tearing during removal.

Another primary object of the present invention is to provide a head harness and antler protection device which securely holds the head of an animal during the skinning process without damaging the head or antlers of the animal.

Another further object of the present invention is to provide a device for skinning an animal which is easily carried in the vehicle of the hunter and easily deployable in the outdoor environment.

Another further object of the present invention is to provide a device for skinning an animal which is of simple construction and lends itself to low cost, efficient, mass production techniques.

Viewed from a first vantage point it is an object of the present invention to provide a method for removing the skin of a game animal without vertically orienting the animal, the steps including: cutting the skin of the animal in a pattern which facilitates removal of the skin from the animal including a cut around the neck of the animal, attaching the head of the animal to a stationary object, separating a small skin portion from the animal adjacent and below the neck of the animal, securing the small skin portion to a vehicle, and moving the vehicle away from the stationary object while the animal is oriented in a horizontal plane, vertically offset from the ground, whereby the skin is removed from the animal without necessitating vertical orientation of the animal above ground as from a tree.

Viewed from a second vantage point it is an object of the present invention to provide a horizontal animal skinning and protection device for removal of a game animal's skin without the animal touching the ground after skinning and without vertical suspension of the animal, comprised of a head harness, a skin remover and a wrap-around game bag, said head harness including means to secure an animal's head to a stationary object, said skin remover attachable between an animal's hide and a moveable object, and said wrap-around game bag having a first deployed position for location between the animal and the ground and a second secured position enclosed around the skinned animal.

These and other objects will be made manifest when considering the following detailed specification when taken in conjunction with the appended drawing figures.

DESCRIPTION OF PREFERRED EMBODIMENTS

Figure 1:
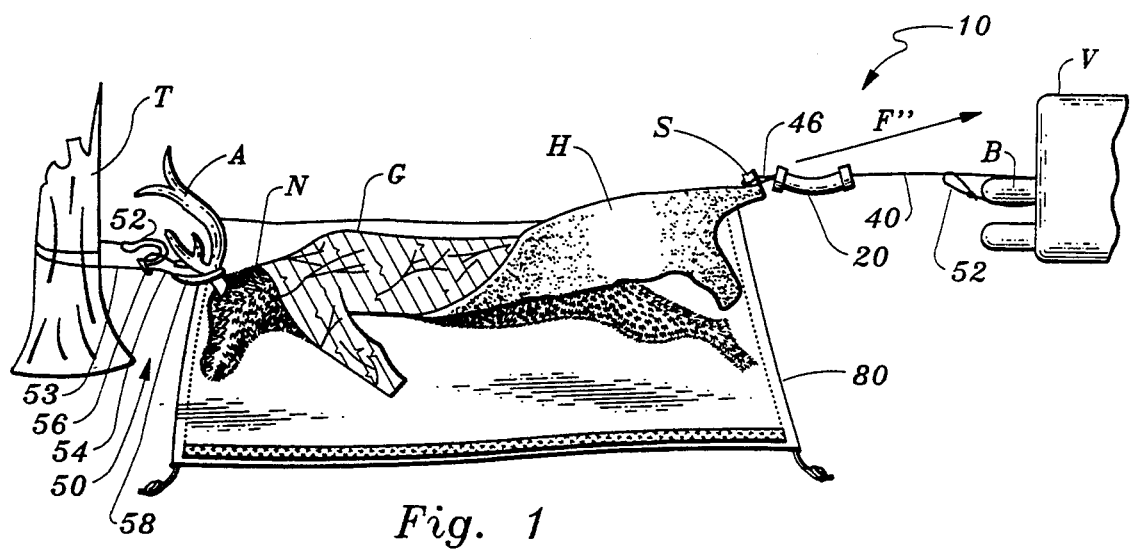
FIG. 1 is an isometric view of the device of this invention in the process of skinning an animal according to the method of this invention.

Turning now to the drawings, wherein like reference numerals represent like parts throughout, the reference numeral 10 is directed to a skin remover apparatus according to one portion of the present invention. This skin remover 10 is utilized in conjunction with a head harness 50 to remove the hide H of a game animal G while a game bag 80 is located beneath the game G allowing the game G to have its hide H removed while in a horizontal, prone position.

In its essence, the skin remover 10 (shown in FIG. 2) includes a cable 40 threaded through and attached to a cylinder 20 which has a curved profile. The cylinder 20 has a first end 22 and a second end 24. The cable 40 has a welded end terminus 42 which is attached to an interior surface 21 of the cylinder 20 on the first end 22. The cable 40 forms a first end loop 46 and returns back into the first end 22 of the cylinder 20. The cable 40 then passes out of the second end 24 of the cylinder 20 whereupon it forms a second end loop 28 by having a second end clamp 29 securely attach the second end of the cable 40 back upon itself.

Figure 2:
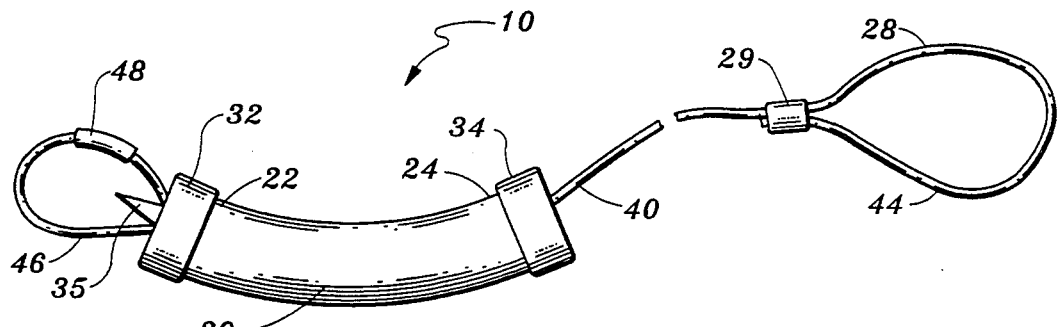
FIG. 2 is a front view of a portion of this invention.
Figure 3:
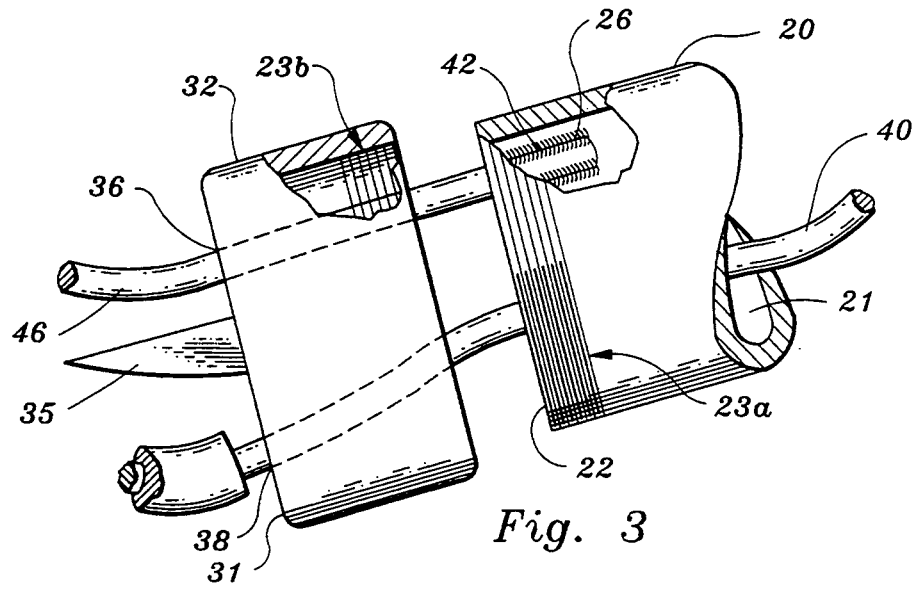
FIG. 3 is a detail of a portion of that which is shown in FIG. 2 with a cutaway revealing interior details.
Figure 7:
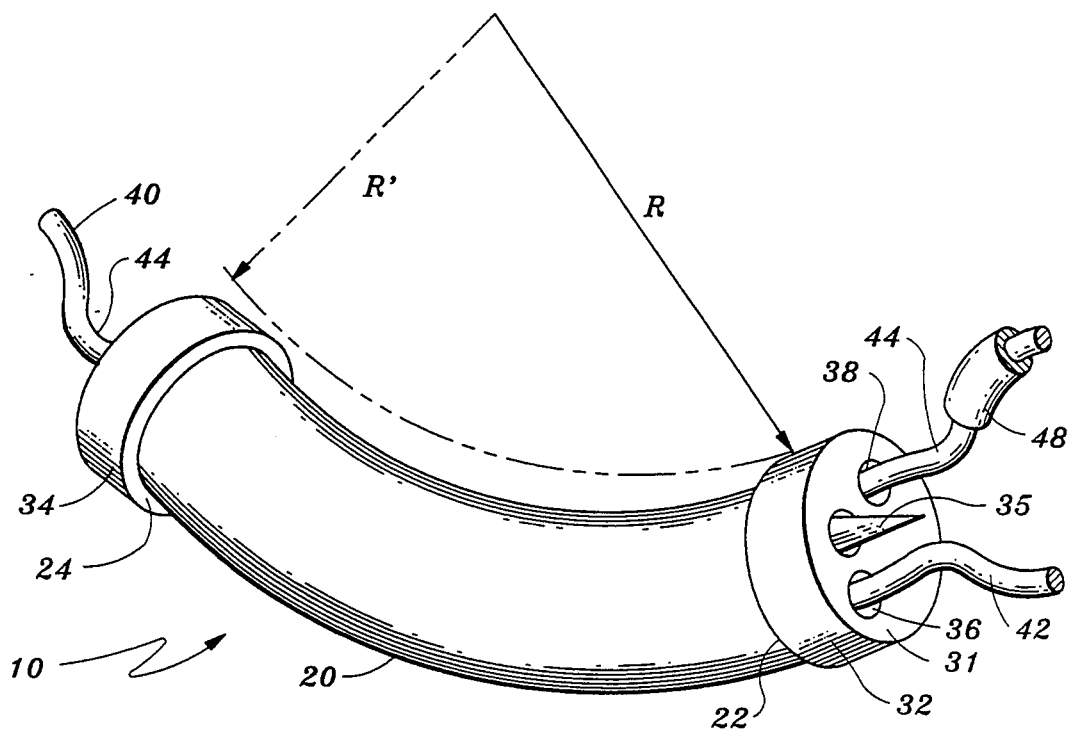
FIG. 7 is an isometric view of that which is shown in FIG. 2.
Figure 8:
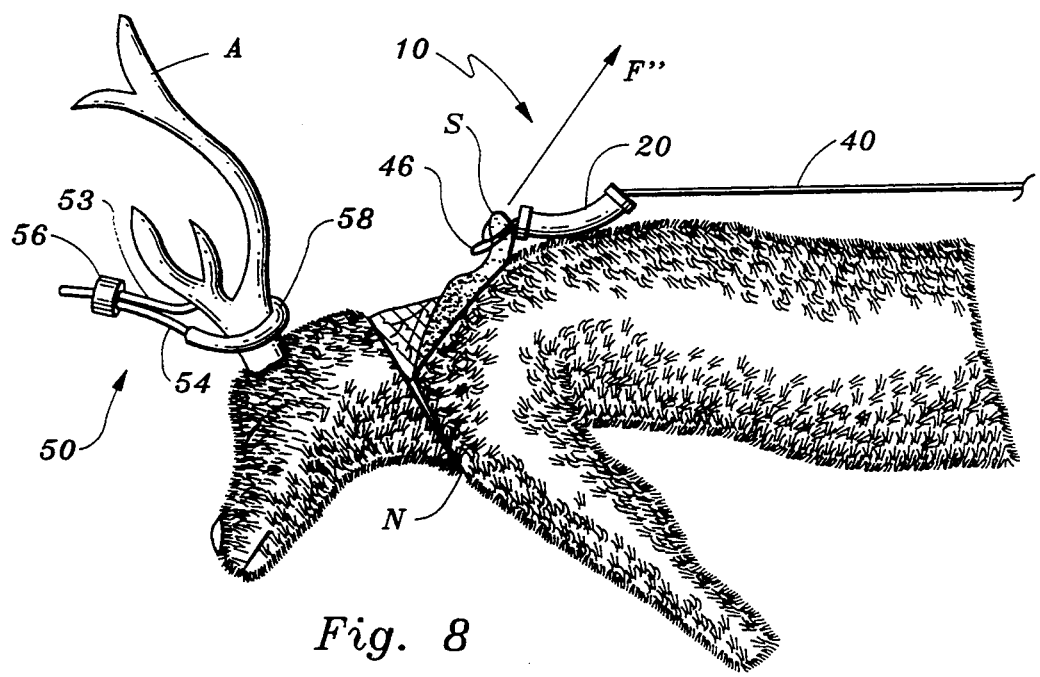
FIG. 8 is a isometric view revealing the device of this invention during an initial portion of the method described by this invention.
Figure 9:
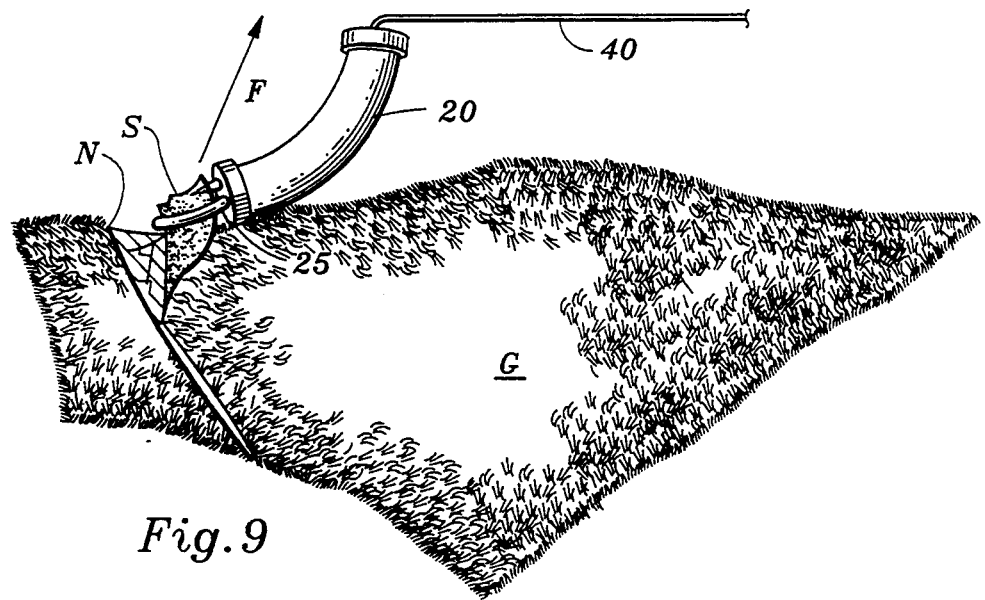
FIG. 9 is a detail of a portion of that which is shown in FIG. 8 representing the device when force is initially applied.
Figure 10:
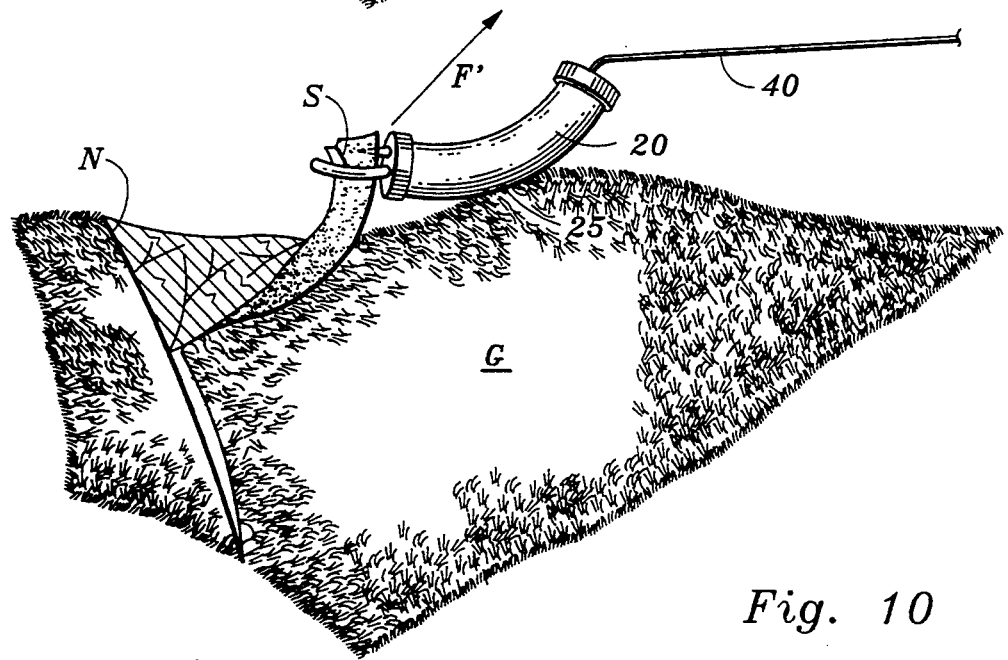
FIG. 10 is a detail of a portion of that which is shown in FIG. 8 representing the device after its state in FIG. 9.
Figure 11:
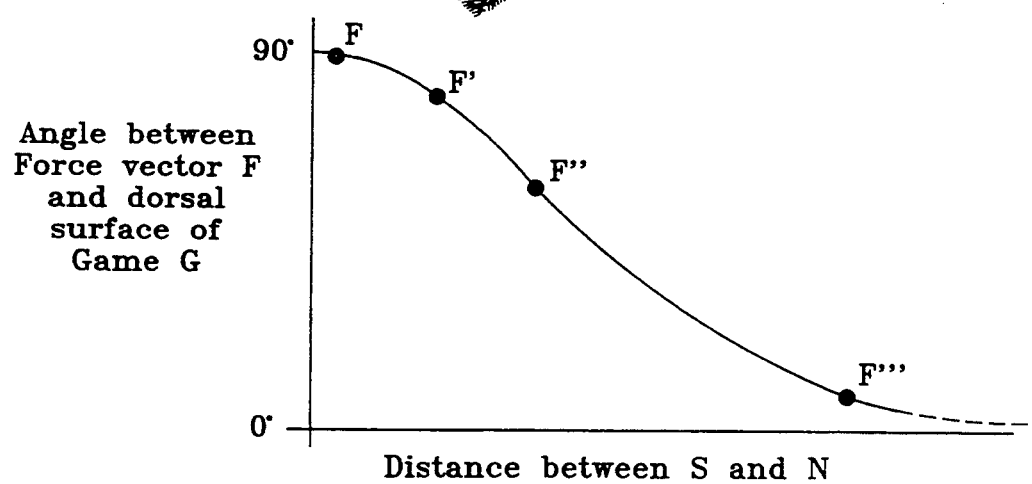
FIG. 11 is a graphic representation of the change in angle of the force vector.

More specifically, and referring to FIGS. 2, 3 and 7, the cable 40 includes a welded end 42 and a free end 44. The welded end 42 is affixed to an interior surface 21 of the first end 22 of the cylinder 20. The means for attachment 26 can take any of several forms. The first end 22 of the cylinder 20 has threads 23a on an outside surface thereof which are complemental to interior thread 23b of a first cap 32 which is locatable over the first end 22 of the cylinder 20. The first cap 32 is in effect a blind bore having an end wall 31 and an annular skirt 33 within which interior threads 23b are formed and has a "top" hole 36 and a "bottom" hole 38 formed in the end wall 31. Also, a conical spike 35 extends from the end wall 31 away from the cylinder 20. Preferably the spike 35 is placed through a hole in the cap 32 and welded in place. Each hole 36, 38 is sized to allow the cable 40 to pass therethrough. Opposite from the first end 22 of the cylinder 20 is located a second end 24. A similarly formed second cap 34 is located over the second end 24. The caps 32 and 34 prevent dirt and debris from entering the cylinder 20.

The cable 40 is routed through the cylinder 20 as follows. The first end 22 is connected to the cylinder 20 at the weld 26 on the inside surface 21 of the first end 22 of the cylinder 20. As an alternative, other methods of cable 40 connection to the cylinder 20 may be utilized. The cable 40 then passes out of the top hole 36 of the first cap 32 and forms a loop 46. Next, the cable 40 passes through the bottom hole 38 of the first cap 32 and passes through the interior of the cylinder 20 to the second end 24 of the cylinder 20. The cable 40 then passes through the second cap 34 and loops again forming a second end loop 28. The second end loop 28 is created by having the cable 40 turn back on itself such that a free end 44 is clamped with a second end clamp 29 to a portion of the cable 40. Thus, the free end 44 has a second end loop 28 formed thereby. A hook 52 may be located on loop 28.

The loop 46 adjacent the first end 22 of the cylinder 20 is at least partially surrounded by a coating 48. The coating 48 is preferably made of a rubber-like substance. The cylinder 20 preferably has a curving profile when viewed from the side. The cylinder 20 has radius of curvature R which may be constant (see FIG. 8). In an alternative embodiment, the radius of curvature R may be variable so that there may be various radii of curvature R' having different values than the radius of curvature R. The purpose of the radius of curvature is to provide a turning moment when removing the skin (FIGS. 8–11). A fulcrum defines a pivot point 25 converting a horizontal force F into a vertical force. This construction provides better leverage especially when initiating the skinning process.

Figure 5:
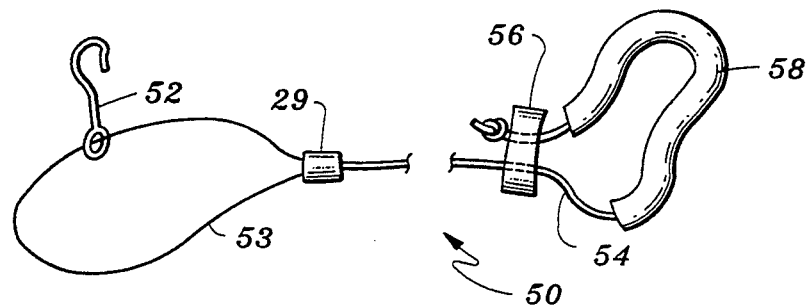
FIG. 5 is a plan view of another portion of the device of this invention.

Referring now in detail to FIG. 5, reference numeral 50 refers to the head harness and antler protection apparatus. In essence, the head harness includes a game attachment loop 54 which is adjustable by a loop adjustment bracket 56. The bracket 56 receives a knotted end of line 53. The bracket 56 allows a pair of lines 53 to slide therewithin. Extending from the game attachment loop 54 is a line 53 which has a hook 52 connected thereto. The game attachment loop 54 has a coating 58 over its outer surface. Line 53 can be equipped with a clamp 29 to form a second loop. Hook 52 can reside on this loop.

Figure 4:
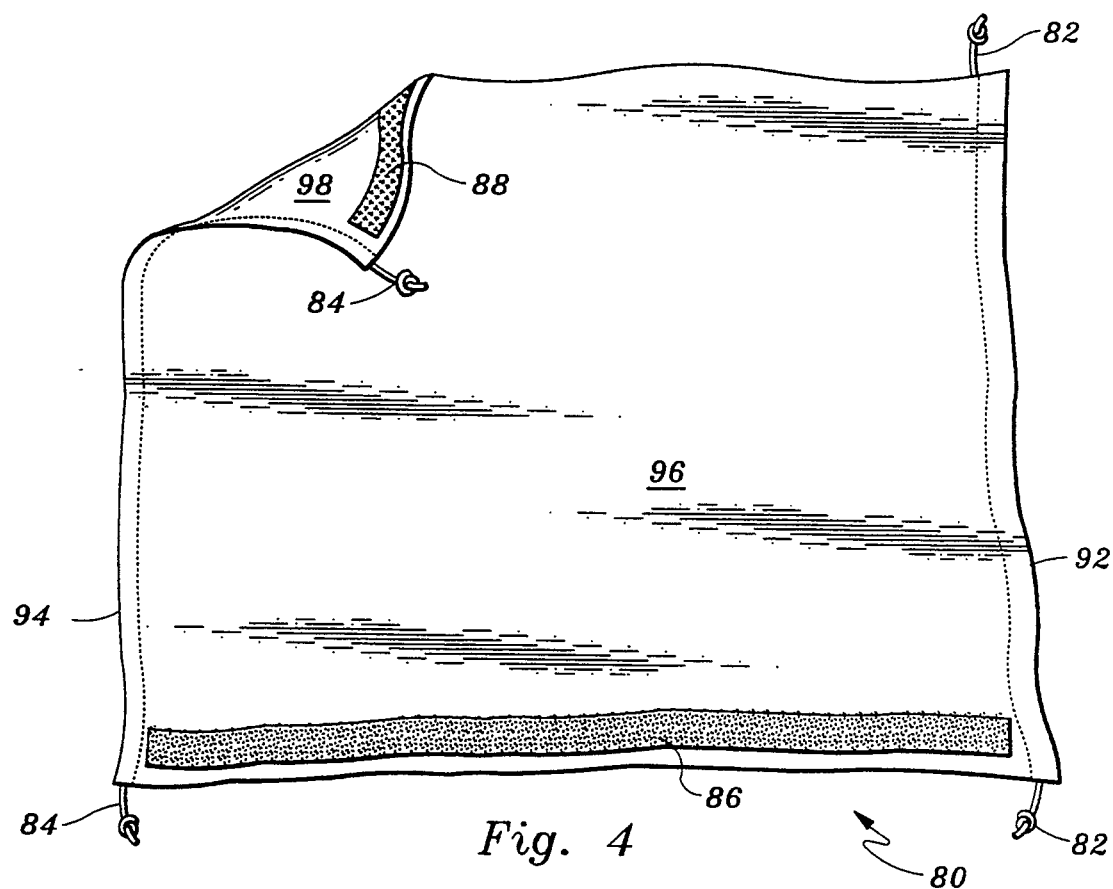
FIG. 4 is a plan view of a portion of the device of this invention.

Referring now in detail to FIGS. 1 and 4, the bag 80 is shown in detail. In its essence, the bag 80 is a substantially flat flexible rectangular construct having a top surface 96 and a bottom surface 98. A plurality of miniature fastening hooks 86 such as those bearing the trade name Velcro ® extend from a swatch which is located along one edge of the top surface. On an edge opposite the edge having the fastening hooks 86 and on the bottom surface 98 of the bag 80 are located a plurality of fastening loops 88 of a form complemental to the fastening hooks 86. The two sides of the bag 80 which do not have fastening hooks or loops 86, 88 located therealong have respectively a first sleeve 92 and a second sleeve 94. The first sleeve 92 and second sleeve 94 define an opening formed in the bag 80 of an elongate nature each of which are sized to house a drawstring 82, 84. The first sleeve 92 receives the first drawstring 82 and the second sleeve 94 receives the second drawstring 84.

In use and operation, the skin remover 10, head harness 50 and bag 80 are used in the following manner to remove the hide H from a game animal G. Initially, the killed animal is prepared for skinning by making a series of incisions through the skin of the animal. One such incision is required which circumscribes the neck N of the game G. Other incisions are made in a pattern which is well known in the prior art and which facilitates removal of the hide H in a manner which establishes the hide H as a single substantially planar construct once skinning has been accomplished. These incisions include, for instance, an incision from the neck N down the belly of the game G and incisions down the legs of the game G.

Once the incisions have been made, if the game G is lightweight, the game G may be placed on top of the bag 80. The head harness 50 is then utilized by placing the game attachment loop 54 around antlers A of the game G and the game attachment loop 54 is tightened around the antlers A by adjustment of the loop adjustment bracket 56. If the animal does not have antlers or the user prefers not to wrap the game attachment loop 54 around the antlers A, the user may place the game attachment loop 54 about the neck N of the game G. The coating 58 protects the head and antlers A of the game G from damage. The line 53 of the head harness 50 is then wrapped a plurality of times about a tree trunk T, a car bumper or some other stationary object such as a rock.

Figure 6:
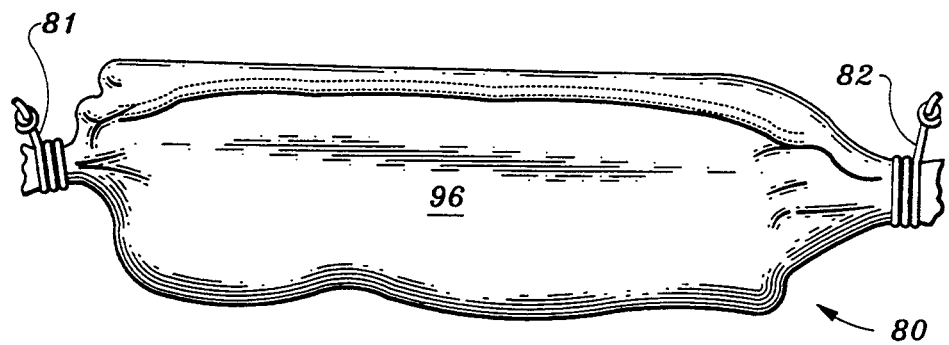
FIG. 6 is a front view of that which is shown in FIG. 4 after it has been utilized to bag a game animal.

Once the head harness 50 is securely in place, the skin remover 10 is then attached. First, the cable 40 is passed through the cylinder 20 such that the loop 46 is expanded to a large diameter. Next a small skin portion S directly below the main incision around the neck of the game G is gathered by peeling away an initial portion of the hide H (see FIG. 6). Once this small skin portion S has been gathered, the loop 46 is passed around the small skin portion S and the free end 44 of the skin remover 10 is extended to shorten the loop 46, attaching the loop 46 securely around the small skin portion S. This action causes the spike 35 to penetrate the small skin portion S. The coating 48 is then the only portion of the cable 40 which is in contact with the small skin portion S. The free end 44 of the skin remover 10 is then attached to the bumper of a vehicle V or to some other object capable of exerting the force required. In an alternative embodiment the force exerting object and the stationary object may be swapped.

With the skin remover 10 in position as described above, the vehicle V is then moved in a direction away from the tree T or other stationary object. As the vehicle begins to move away from the tree T the cable 40 begins to exhibit increased tension. This tension increases the ability of the loop 46 to securely hold the small skin portion S of the game G by tightening the loop 46. As the tension in the cable 40 increases the amount of force exerted by the game G downward is decreased. This is because the point of attachment of the line 53 to the tree T and the point of attachment of the cable 40 to the vehicle V is slightly above the center of gravity of the game G, thus exerting an upward force on the game G.

This force is maximized at a time just before the hide H of the game G begins to peel away from the game G. When the point of maximum tension is reached, the bag 80 is most easily locatable between the game G and the ground. The bag 80 may thus be easily positioned at this time. At this time also notice that the hide H of the game G is still substantially in place, especially along an underside of the game G. Thus, no contamination of the game G occurs by contact of the game G with the ground and associated dirt and debris. Once the bag is located in place between the game G and the ground, the vehicle V may then proceed to move away from the tree T.

As the force F increases, eventually it exceeds the adhesion force between the hide H and the game G. At this point, the hide H begins to peel away from the game G. The curved profile of the cylinder 20 facilitates the effective removal of the hide H from the game G without tearing of the hide H by ensuring that the portion of the cable 40 which extends out of the first end 22 of the cylinder 20 provides a force F perpendicular to a dorsal side of the game G. This ensures that a peeling motion will occur initially. As the peeling process continues the force F rapidly approaches a direction parallel to the dorsal side of the game G due to immigration of the fulcrum 25 along the cylinder 20 (see FIGS. 9 and 10). The more parallel the force vector F becomes the more easily the peeling process is completed.

Once the hide H is entirely removed from the game G, the game G is located prone in the center of the bag 80. To seal the game G into the bag 80, the user takes the fastener hooks 86 and places them adjacent to the fastener loops 88 allowing the previously flat bag 80 to attain a tubular shape. Finally, the two drawstrings 82, 84 are pulled tight enclosing the game G within the bag 80 (see FIG. 6). The game G and associated bag 80 may then be easily placed in the bed of a truck or attached to a vehicle in some other manner for transportation.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method for removing the skin of a game animal, the steps including:
    cutting the skin of the animal in a pattern which facilitates removal of the skin from the animal including a cut around the neck of the animal;
    positioning the animal on the ground;
    attaching a head of the animal to a first object at a location sufficiently proximate to the ground that the animal remains adjacent the ground;
    separating a small skin portion from the animal adjacent and below the neck of the animal;
    securing the small skin portion to a second object; and moving the first and second objects away from each other to remove the skin from the animal without necessitating further elevation of the animal above said head attaching location proximate to the ground;

placing a game bag in the form of a foldable tarp under the animal during said moving step; and wrapping the game bag around the animal after removal o the skin; whereby the animal shall be isolated from dirt and debris on the ground before removal of the skin.

2. The horizontal skinning method of claim 1 wherein said placing step includes the steps of:

positioning the game bag alongside the animal immediately before said moving step;

monitoring the animal during said moving step for a condition where the skin is still in place on an underside of the animal and a force exerted by relative motion of the objects is at a maximum causing downward force of the animal to be minimized by the tension forces exerted by the first and second objects;

orienting the game bag as a tarp; and sliding the tarp-like game bag under the animal at the time of downward force minimization.

3. The horizontal skinning method of claim 1 including the further step of wrapping the game bag and securing the game bag closed around the animal, enclosing the animal therein.

4. The horizontal skinning method of claim 3 wherein said wrapping step includes forming the game bag as a rectangular construct, sealing together fastening means located along opposite edges of the game bag and drawing tight draw strings located along two opposite edges of the game bag which do not include said fastening means.

5. The horizontal skinning method of claim 1 wherein said securing step includes:

providing a cable having a first end attachable around the small skin portion in a manner which is adjustable to grip more tightly as cable tension increases and a second end attachable to the second object;

attaching the cable first end to the small skin portion; and attaching the cable second end to the second object.

6. The horizontal skinning method of claim 5 wherein said cable first end attaching step includes the steps of:

providing the cable first end with a hollow cylinder through which it passes entirely through and with a loop in the cable first end which extends out of the cylinder and with the cable first end fixed to an inside wall of the cylinder;

locating the small skin portion within the loop and adjacent a spike protruding from the cylinder; and reducing the diameter of the loop by pulling on the second end of the cable; whereby the loop and the spike firmly grasp the small skin portion.

7. The horizontal skinning method of claim 5 including the step of providing the cable first end with a rubberized coating where it attaches to the small skin portion of the animal, whereby tearing of the small skin portion from the skin of the animal is avoided.

8. A method for removing the skin of a game animal, the steps including:

cutting the skin of the animal in a pattern which facilitates removal of the skin from the animal including a cut around the neck of the animal;

attaching a head of the animal to a first object;

separating a small skin portion from the animal adjacent and below the neck of the animal;

securing the small skin portion to a second object; and moving one object away from the other object;

whereby the skin is removed from the animal without initially necessitating elevation of the animal above the ground;

wherein said securing step includes:

providing a cable having a first end attachable around the small skin portion in a manner which is adjustable to grip more tightly as cable tension increases and a second end attachable to the second object;

attaching the cable first end to the small skin portion; and attaching the cable second end to the second object; providing the cable first end with a rubberized coating where it attaches to the small skin portion of the animal, whereby tearing of the small skin portion from the skin of the animal is avoided; and wherein said moving step removes the animal skin while the animal remains oriented horizontally through the steps of:

providing the cylinder of the cable first end with a curving profile;

orienting the cylinder in a concave upward position; and applying tension to the cable.

9. The horizontal skinning method of claim 1 wherein said attaching step includes:

providing a head harness having a game attachment loop locatable around a head or antlers of the game animal, and a line attached to the loop;

attaching the loop to the animal on a head or antler portion thereof; and attaching the line to the first object at a location on the first object sufficiently close to the ground to prevent the animal from being lifted substantially vertically.

10. The horizontal skinning method of claim 9 wherein said attaching the line to the stationary object includes the steps of:

providing a hook attached to an end of the line opposite the loop, wrapping the line around the first object a plurality of times, and attaching the hook to the line.

11. The horizontal skinning method of claim 1 wherein said cutting step includes making cuts in the animal skin down a belly of the animal and down each leg of the animal in a manner such that the skin will form a substantially flat thin "hide" once the moving step is complete.

12. A horizontal animal skinning and protection device for removal of a game animal's skin without the animal touching the ground after skinning and without suspension of the animal substantially entirely above ground, comprising, in combination:

a head harness, a skin remover, and a wrap-around game bag;

said head harness including means to secure an animal's head to a first object at a location sufficiently proximate to the ground to avoid lifting of the animal to secure the animal's head to the first object, said skin remover including means for attachment between an animal's hide and a second object, and said wrap-around game bag having a first deployed position for location between the animal and the ground and a second secured position enclosed around the skinned animal.

13. The device of claim 12 wherein said skin remover includes a cable and a cylinder, said cable having a first end affixed to an inside wall of the cylinder, a second end attachable to said second object and a loop between said first end and said second end extending out of said cylinder at a first cylinder end opposite a second cylinder end, said second cylinder end being nearer said moveable object, wherein said loop of said cable of said skin remover is attachable around a small wad of the animal's skin with said animal positioned on the ground.

14. The device of claim 13 wherein said loop is coated with a coating protecting the skin from tearing by said cable.

15. The device of claim 13 wherein said cylinder includes caps having holes only for passing of the cable therethrough.

16. The device of claim 15 wherein one of said caps has a blind bore which is threadably attached to said first cylinder end and includes a spike protruding from a side of said cap opposite said blind bore which extends away from said cap;
whereby skin gathered by said loop of said cable is pierced by said spike, ensuring that the skin remains attached to the skin remover.

17. A horizontal animal skinning and protection device for removal of a game animal's skin without the animal touching the ground after skinning and without suspension of the animal substantially entirely above ground, comprising, in combination:
a head harness,
a skin remover, and
a wrap-around game bag;
said head harness including means to secure an animal's head to a first object,
said skin remover including means for attachment between an animal's hide and a second object, and
said wrap-around game bag having a first deployed position for location between the animal and the ground and a second secured position enclosed around the skinned animal;
wherein said skin remover includes a cable and a cylinder, said cable having a first end affixed to an inside wall of the cylinder, a second end attachable to said second object and a loop between said first end and said second end extending out of said cylinder at a first cylinder end opposite a second cylinder end, said second cylinder end being nearer said moveable object, wherein said loop of said cable of said skin remover is attachable around a small wad of the animal's skin; and
wherein said cylinder has a curved profile which conforms to a curve necessary to direct the force applied to the skin of the animal through the cable in an initial orientation perpendicular to a dorsal surface of the game.

18. The device of claim 12 wherein said wrap-around game bag is a rectangular thin flexible construct including a top surface and a bottom surface, said top surface having fastener hooks along one edge, said bottom surface having complemental fastener loops along another edge opposite said one edge of said top surface, said bag including drawstrings sewn into each edge of said bag not having fastener loops or hooks; whereby the game is encloseable in said bag by first sealing said fastener hooks and said fastener loops together and then closing said drawstrings.

19. The device of claim 12 wherein said head harness includes a loop with a rubberized coating attachable to the head or antlers of the animal.

20. A skinning kit including:
an attachment means adapted to span between a head of an animal to be skinned and a first object in a substantially horizontal orientation and sufficiently close to the ground to not require elevation of the animal above ground,
a hide grasping skin remover attached between the hide and a second object,
a bag opened as a tarp underlying the animal, and
means to move the two objects with respect to each other.

21. A method for removing the skin of a game animal, the steps including:
cutting the skin of the animal in a pattern which facilitates removal of the skin from the animal including a cut around the neck of the animal;
attaching a head of the animal to a first object;
separating a small skin portion from the animal adjacent and below the neck of the animal;
securing the small skin portion to a second object; and
moving one object away from the other object;
whereby the skin is removed from the animal without initially necessitating elevation of the animal above the ground; and
wherein said moving step removes the animal's skin while the animal remains oriented horizontally through the steps of:
providing a cable having a first end attachable to the small skin portion of the animal, and a second end attachable to the second object,
providing the cable first end with a hollow cylinder through which it passes entirely through and with a loop in the cable first end which extends out of the cylinder,
providing the cylinder of the cable first end with a curving profile,
orienting the cylinder in a concave upward position, and
applying tension to the cable.

22. A horizontal animal skinning and protection device for removal of a game animal's skin without the animal touching the ground after skinning and without suspension of the animal substantially entirely above ground, comprising, in combination:
a head harness,
a skin remover, and
a wrap-around game bag;
said harness including means to secure an animal's head to a first object,
said skin remover including means for attachment between an animal's hide and a second object, and
said wrap-around game bag having a first deployed position for location between the animal and the ground and a second secured position enclosed around the skinned animal; and
wherein said skin remover includes a cable and a cylinder, said cable having a first end and a second end attachable to the second object and a loop between the first end and the second end extending out of the cylinder at a first cylinder end opposite a second cylinder end, said second cylinder end being nearer said second object, wherein said loop of said cable of said skin remover is attachable around a small wad of the animal's skin; and wherein said cylinder has a curved profile which conforms to a curve necessary to direct the force applied to the skin of the animal through the cable in an initial orientation perpendicular to a dorsal surface of the game.

* * * * *